Patented May 12, 1925.

1,537,260

UNITED STATES PATENT OFFICE.

WALTER ALBERT PATRICK, OF BALTIMORE, MARYLAND, ASSIGNOR TO THE SILICA GEL CORPORATION, OF BALTIMORE, MARYLAND, A CORPORATION OF MARYLAND.

METHOD OF TREATING LIQUIDS TO REMOVE OR RECOVER SUBSTANCES THEREFROM.

No Drawing. Application filed February 25, 1921, Serial No. 447,857. Renewed December 26, 1922.

*To all whom it may concern:*

Be it known that I, WALTER A. PATRICK, a citizen of the United States, and residing at Baltimore city, State of Maryland, have invented certain new and useful Improvements in Methods of Treating Liquids to Remove or Recover Substances Therefrom, of which the following is a specification.

In industrial processes it is frequently necessary or desirable to separate a solute from a solution. This separation may be primarily for the purpose of removing an impurity or it may be for the purpose of recovering and utilizing a valuable constituent in the solution.

The present invention aims to provide a method of separating or recovering a solute from a solution, which eliminates the difficulties and limitations of previous methods whereby the solute may be more completely and cheaply removed than heretofore.

Briefly stated, the invention consists in adsorbing a solute from a solution by means of a porous material having pores of the proper size to adsorb the solute. Thereafter the substance adsorbed in the material may be liberated or recovered in any suitable manner, as by heating the material.

It is known that a fine porous structure is demanded in order to efficiently adsorb a gas or vapor from a mixture of gases or vapors. It is believed to be novel however to adsorb a solute from a solution by means of a porous material having very fine, or ultra microscopic pores, as defined hereinafter.

The pores of the adsorbing material required in the present method are so small that it is a very difficult matter to accurately determine and define their size. For this purpose however, reference may be had to the amount of water that one gram of material will adsorb when exposed to water vapor under definite condition of temperature and partial pressure of water vapor.

A liquid that wets a capillary tube will rise in the tube above the level of the surface of the liquid surrounding the same, the extent of the rise varying with the diameter of the tube. The vapor pressure of the liquid inside the tube is smaller than the vapor pressure at the level surface of the liquid outside the tube. This lowering of the vapor pressure by the liquid within the capillary tube is not appreciable until the diameter of the tube is extremely small, and the smaller the bore of the tube, the greater the decrease in vapor pressure. The amount of water adsorbed by a porous body at a given temperature and partial pressure depends both upon the size of the pores and upon the total interior volume of the pores. By determining the amount of a given material, water for example, which may be adsorbed by each of the porous bodies under the same condition of temperature and partial pressure, we have a means of comparing the size and volume of the pores in the two adsorbents. For example one gram of silica gel has a total internal volume of above 0.41 cc. In other words, if we completely fill the pores in silica gel with water, the amount of water taken up will be approximately 41% of the initial weight of the gel. A sufficient percentage of the total internal volume in silica gel is made up of pores of such size that the gel will adsorb at 30° C. about 21% of its own weight of water at a partial pressure of substantially 22 mm.

Kieselguhr and boneblack under the above conditions will adsorb practically no water. Highly activated charcoal such as cocoanut charcoal will adsorb more water than the silica gel mentioned above. It follows therefore that kieselguhr and boneblack have practically no pores as small as the greater part of the pores in silica gel. On the other hand, highly activated charcoal has more small pores than silica gel.

According to the present discovery it is found that materials which adsorb water vapor to such an extent as to contain less than about 10% of their initial weight of water when in equilibrium with water vapor at 30° C. and at a partial pressure of substantially 22 mm. of mercury have pores too large to be of any practical value in adsorbing solutes from solutions. The present invention therefore includes only materials having a sufficient number of small pores so that they will adsorb water vapor to such an extent as to contain not less than 10% of their initial weight of water when in equilibrium with water vapor at 30° C. and at not exceeding a partial pressure of 22 mm. of mercury.

The material preferred for practicing the present method is silica gel having a structure such that it will adsorb water vapor to such an extent as to contain substantially 21% of its own weight of water calculated on the dry basis when in equilibrium with water vapor at 30° C. and a partial pressure of substantially 22 mm. of mercury. In cases where silica gel is not suitable, other gels or adsorbing materials may be used provided they have a sufficient number of small pores as defined above.

In order to practice the present invention intelligently and without extensive experiments, it is desirable to know which solute of a solution will be adsorbed by a porous material having pores not exceeding in size the limit specified above. For this purpose it is necessary to know the magnitude of the interfacial surface tension between the walls of the porous material and each of the components of the solution. That component will be adsorbed that exhibits the smallest surface tension towards the wall of the porous material. For example acetic acid is not adsorbed by silica gel from an aqueous solution, although it is adsorbed to a marked extent from a benzol solution. This difference is due to the fact that water has a lower surface tension toward silica gel than acetic acid has toward the same material. Hence in the case of acetic acid in the water solution, the water having the lower surface tension toward the gel would be adsorbed. In this case the removal of the water would render the solution more concentrated. This action may be termed negative adsorption. In the case of the acetic acid in the benzol, the acetic acid has a lower surface tension toward the silica gel than benzol exhibits towards the same. Hence the acetic acid is adsorbed from the benzol solution.

Silica gel having substantially the pore size defined above, and other adsorbents having a porous structure such that they will adsorb water to such an extent as to contain not less than 10% of their initial weight of water when in equilibrium with water vapor at 30° C. and a partial pressure of substantially 22 mm. of mercury, will not adsorb dissolved substances from aqueous solution for the reason that water has a lower surface tension towards silica gel and these other adsorbents, than the dissolved substances have. Because of this action it may be said that silica gel and said other adsorbents have in effect a water surface so far as their surface tension relations to other substances are concerned.

Throughout the specification, the term "adsorption" as applied to solutions is used in the ordinary accepted sense. It is, of course, true that the adsorbent, after it has come into equilibrium with respect to a solution, contains both solute and solvent in its pores. Thus, when silica gel, for example, is kept in contact with a solution of acetic acid in benzol until equilibrium is established, examination will show that the gel has taken up both benzol and acetic acid. But if the adsorbent is filtered off, the filtrate will be less concentrated with respect to acetic acid than the solution before treatment, and the mixture taken up by the adsorbing material will, of course, be more concentrated. Accordingly, we say that acetic acid is adsorbed by silica gel from a solution of the same in benzol. It will similarly be adsorbed from many other organic solvents in which it is soluble.

If, however, we treat in a similar manner an aqueous solution of acetic acid, the mixture inside the gel pores will be found to be less concentrated and the filtrate more concentrated, with respect to acetic acid, than the solution before treatment. Accordingly, we say that acetic acid will not be adsorbed by silica gel from an aqueous solution. Since the treatment actually increases instead of decreases the concentration of the solution, this is spoken of as negative adsorption.

Having set forth the rule for determining what component will be adsorbed from a solution by a suitable porous material, the factors determining the magnitude of the adsorptive effect will now be set forth. In adsorbing gases or vapors by means of a porous material, it is known that the greatest adsorptive effect is obtained with those vapors and gases having the highest boiling points. Similarly in connection with solutions, the separation of a new phase from the solution is easier the smaller the solubility of the substance in the solvent. As a measure of solubility the critical solution temperature may be selected. I have found that the greatest adsorptive effect will be obtained from a solution having the highest critical solution temperature. For example, butyric acid is adsorbed from gasoline more strongly than it is from toluene, the critical solution temperature of the first solution being higher than that of the latter.

Moreover, I have discovered that in addition to the above, the extent of the adsorption is also influences by the difference in density between the components of the solution. The smaller the difference in density, the greater will be the adsorption of one of the components from the solution.

The matter taken up by the adsorbing material (of course after the latter has been separated from the solution) may be liberated in any suitable manner, as by heating the material; passing air over the same; or subjecting the material to a pressure less than atmospheric. In the second and third methods mentioned, the air or material may also be heated.

Having thus described the invention what is claimed as new and desired to be secured by Letters Patent is:

1. The method of separating dissolved matter from non-aqueous solutions consisting in bringing into intimate contact with the solution an adsorbing material having pores of such size that it will adsorb water vapor to such an extent as to contain not less than substantially 10% of its own weight of water at 30° C. when in equilibrium with water vapor at a partial pressure of substantially 22 mm. of mercury.

2. The method of separating dissolved matter from non-aqueous solutions consisting in bringing into intimate contact with the solution an adsorbing material having pores smaller than the pores in kieselguhr.

3. The method of separating dissolved matter from non-aqueous solutions consisting in adsorbing the dissolved matter by a porous material which has a porous structure substantially the same as silica gel.

4. The method of separating dissolved matter from non-aqueous solutions consisting in adsorbing the dissolved matter by silica gel.

5. The method of separating dissolved matter from solution consisting in adsorbing the dissolved matter by a porous material which has a porous structure substantially the same as silica gel, the surface tension of the adsorbing material toward the dissolved matter being less than toward the solvent.

6. The method of separating dissolved matter from solution consisting in bringing into intimate contact with the solution an adsorbing material having pores of such size that it will adsorb water vapor to such an extent as to contain not less than substantially 10% of its own weight of water at 30° C. when in equilibrium with water vapor at a partial pressure of substantially 22 mm. of mercury, the surface tension of the adsorbing material toward the dissolved matter being less than toward the solvent.

7. The method of separating dissolved matter from solution consisting in adsorbing the dissolved matter by silica gel, the surface tension of the gel toward the dissolved matter being less than toward the solvent.

8. The method of separating dissolved matter from solution consisting in bringing into intimate contact with the solution an adsorbing material having a lower surface tension toward the dissolved matter than toward the solvent, said material having pores of such size that it will adsorb water vapor to such an extent as to contain not less than 10% of its own weight of water when in equilibrium with water vapor at 30° C. and at a partial pressure of substantially 22 mm. of mercury and thereafter liberating the adsorbed matter.

9. The method of separating dissolved matter from non-aqueous solutions consisting in bringing into intimate contact with the solution an adsorbing material having pores smaller than the pores in kieselguhr and thereafter liberating the adsorbed matter.

10. The method of separating dissolved matter from non-aqueous solutions consisting in adsorbing the dissolved matter by a porous material which has a porous structure substantially the same as silica gel and thereafter liberating the adsorbed matter.

11. The method of separating dissolved matter from non-aqueous solutions consisting in bringing into intimate contact with the solution an adsorbing material having pores of such size that it will adsorb water vapor to such an extent as to contain not less than substantially 10% of its own weight of water at 30° C. when in equilibrium with water vapor at a partial pressure of substantially 22 mm. of mercury, and thereafter heating the adsorbing material to liberate the adsorbed matter.

12. The method of separating dissolved matter from non-aqueous solutions consisting in adsorbing the dissolved matter by a gel which has a porous structure substantially the same as silica gel.

13. The method of separating dissolved matter from solutions consisting in adsorbing the dissolved matter by a porous gel which has a porous structure substantially the same as silica gel, the surface tension of the gel toward the dissolved matter being less than toward the solvent.

14. The method of separating dissolved matter from non-aqueous solutions consisting in adsorbing the dissolved matter by a gel which has a porous structure substantially the same as silica gel and thereafter liberating the adsorbed matter.

15. The process consisting in treating a solution with silica gel, the gel having a lower surface tension toward the matter dissolved in the solution than toward the solvent, whereby the gel adsorbs dissolved matter and some solvent, and recovering the adsorbed substances from the gel, such recovered substances constituting a more concentrated solution than the original solution.

16. The process consisting in treating a solution with a porous material having pores of such a size that it will adsorb water vapor to such an extent as to contain not less than substantially 10% of its own weight of water at 30° C. when in equilibrium with water vapor at a partial pressure of substantially 22 mm. of mercury, the material having a lower surface tension toward the matter dissolved in the solution than toward the solvent, whereby the porous material adsorbs dissolved matter and takes up some solvent, and recovering said dissolved matter and solvent from the porous material, such recovered substances constituting a solution more concentrated than the original solution.

17. The process consisting in treating a solution with a gel having pores of substantially the same size as silica gel, the gel having a lower surface tension toward the matter dissolved in the solution than toward the solvent, whereby the gel adsorbs dissolved matter and takes up some solvent, and recovering the said adsorbed matter and solvent from the gel, such recovered substances constituting a solution more concentrated than the original solution.

18. The process consisting in treating a solution with a porous material having pores of substantially the same size as silica gel, the material having a lower surface tension toward the matter dissolved in the solution than toward the solvent, whereby the porous material adsorbs dissolved matter and takes up some solvent, and recovering the said dissolved matter and solvent from the porous material, such recovered substances constituting a more concentrated solution than the original solution.

19. The method of increasing the concentration of a solution, consisting in adsorbing in silica gel a portion of the solvent, said solvent having a lower surface tension toward the silica gel than the dissolved substances have.

20. The method of increasing the concentration of a solution, consisting in adsorbing in a gel having pores of substantially the same size as silica gel a portion of the solvent, said solvent having a lower surface tension toward the gel than the dissolved substances have.

21. The method of increasing the concentration of a solution, consisting in adsorbing in a porous material having pores of substantially the same size as silica gel a portion of the solvent, said solvent having a lower surface tension toward the porous material than the dissolved substances have.

22. The method of increasing the concentration of a solution, consisting in adsorbing in a porous material having pores of such a size that it will adsorb water vapor to such an extent as to contain not less than substantially 10% of its own weight of water at 30° C. when in equilibrium with water vapor at a partial pressure of substantially 22 mm. of mercury, a portion of the solvent, said solvent having a lower surface tension toward the porous material than the dissolved substances have.

23. The method of altering the concentration of a solution, consisting in adsorbing in a porous material having pores of such a size that it will adsorb water vapor to such an extent as to contain not less than substantially 10% of its own weight of water at 30° C. when in equilibrium with water vapor at a partial pressure of substantially 22 mm. of mercury, that component of the solution which exhibits the lower surface tension toward the adsorbent.

24. The method of altering the concentration of a solution consisting in adsorbing in a porous material having pores of substantially the same size as silica gel that component of the solution which exhibits the lower surface tension toward the adsorbent.

25. The method of altering the concentration of a solution consisting in adsorbing in a gel having pores of substantially the same size as silica gel that component of the solution which exhibits the lower surface tension toward the adsorbent.

26. The method of altering the concentration of a solution consisting in adsorbing in silica gel that component of the solution which exhibits the lower surface tension toward the adsorbent.

In testimony whereof I hereunto affix my signature.

WALTER ALBERT PATRICK.